US006628812B1

United States Patent
Setlak et al.

(10) Patent No.: US 6,628,812 B1
(45) Date of Patent: Sep. 30, 2003

(54) FINGERPRINT SENSOR PACKAGE HAVING ENHANCED ELECTROSTATIC DISCHARGE PROTECTION AND ASSOCIATED METHODS

(75) Inventors: Dale R. Setlak, Melbourne, FL (US); Daryl Williams, Palm Bay, FL (US); Matthew M. Salatino, Satellite Beach, FL (US)

(73) Assignee: Authentec, Inc., Melbourne, FL (US)

( * ) Notice: Subject to any disclaimer, the term of this patent is extended or adjusted under 35 U.S.C. 154(b) by 0 days.

(21) Appl. No.: 09/568,330

(22) Filed: May 9, 2000

Related U.S. Application Data
(60) Provisional application No. 60/133,421, filed on May 11, 1999.

(51) Int. Cl.[7] .............................................. G06K 9/00
(52) U.S. Cl. ..................................................... 382/124
(58) Field of Search ................. 382/115–118, 124–127, 382/312–315; 356/71, 451; 235/379, 380, 382, 382.5; 713/185, 186; 340/5.53, 5.83; 379/106.04; 361/56; 363/1.07

(56) References Cited

U.S. PATENT DOCUMENTS
5,204,896 A * 4/1993 Oliver ................... 379/106.04
5,940,526 A * 8/1999 Setlak et al. ................ 382/124
5,963,438 A * 10/1999 Chen ...................... 363/21.07
6,130,811 A * 10/2000 Gans et al. .................... 361/56

FOREIGN PATENT DOCUMENTS
EP  0 371 928  6/1990  .......... H02M/3/158
EP  0 789 334  8/1997  ............ G07C/9/00
WO  98 52147  11/1998  ............ G06K/9/20

* cited by examiner

Primary Examiner—Samir Ahmed
Assistant Examiner—Vikkram Bali
(74) Attorney, Agent, or Firm—Allen, Dyer, Doppelt, Milbrath & Gilchrist, P.A.

(57) ABSTRACT

A fingerprint sensor package includes a fingerprint sensing integrated circuit within a housing and comprising a plurality of electric field sensing electrodes and processing circuitry connected thereto. At least one external electrode is carried by the housing for finger contact. An electrostatic discharge (ESD) circuit is provided within the housing and is connected to the at least one external electrode. An isolation circuit is connected to the at least one line of the processing circuitry for external connection. The external electrode and ESD circuit, as well as the line isolation circuit protect the integrated circuit against damage by voltage transients, such as ESD. The at least one external electrode may include first and second external electrodes. The first electrode may be connected to the electrostatic discharge circuit. The processing circuit may further comprise a wake-up circuit for selectively powering predetermined circuit portions responsive to sensing finger contact with the second external electrode. Moreover, the housing may define a recess therein to guide a finger of a user along a predetermined path of travel to contact the first external electrode before the second external electrode.

24 Claims, 5 Drawing Sheets

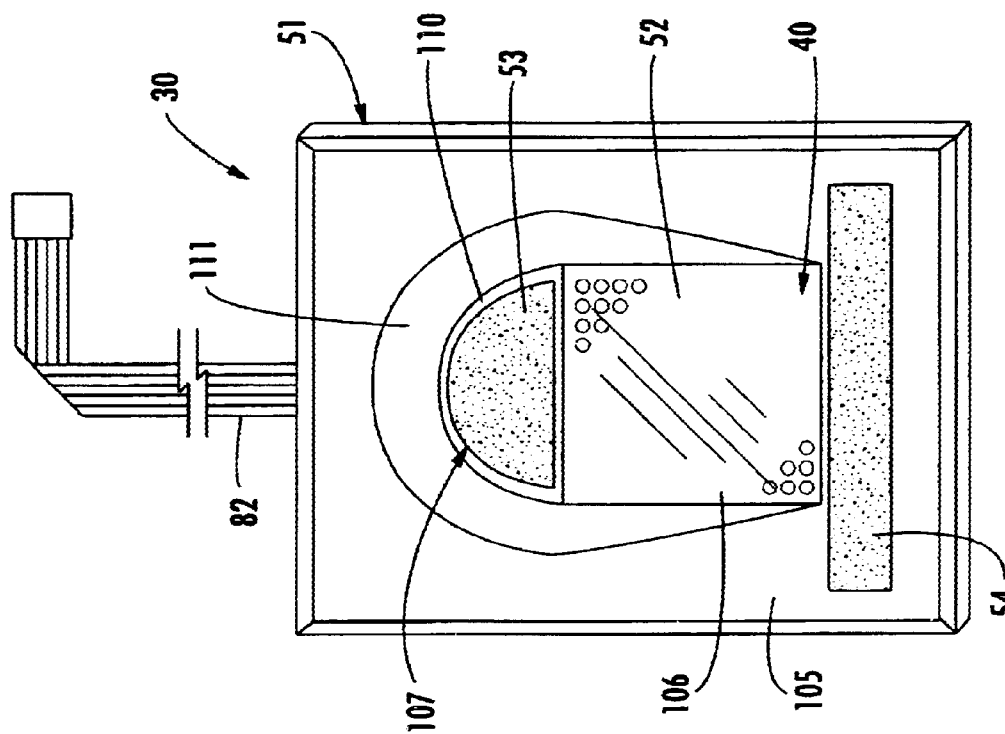
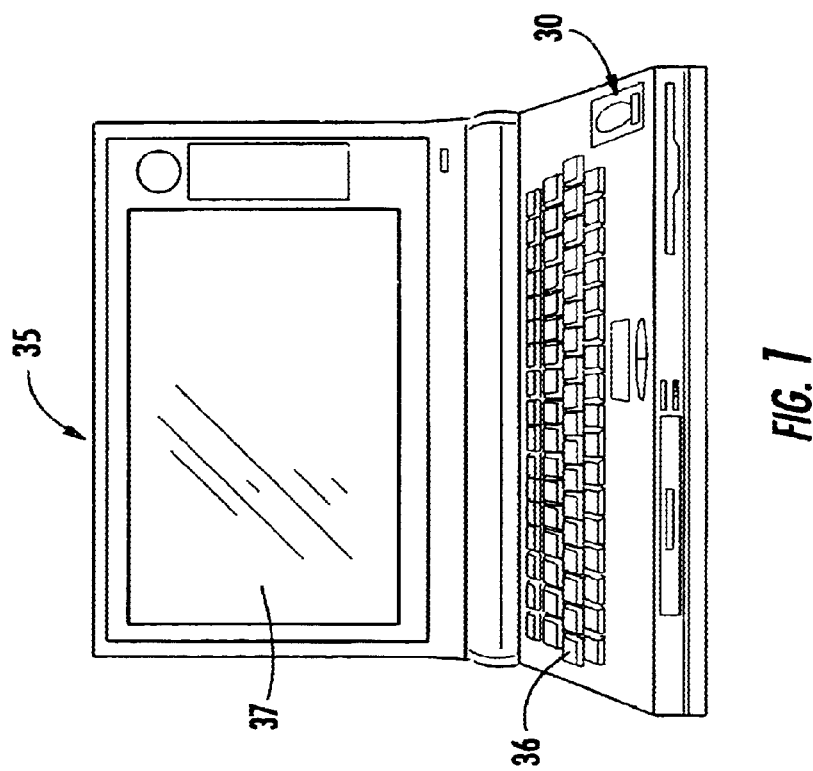
FIG. 2
FIG. 1

FINGERPRINT SENSOR PACKAGE HAVING ENHANCED ELECTROSTATIC DISCHARGE PROTECTION AND ASSOCIATED METHODS

RELATED APPLICATION

This application is based upon prior filed copending provisional application Ser. No. 60/133,421 filed May 11, 1999.

FIELD OF THE INVENTION

The present invention relates to the field of personal identification and verification, and, more particularly, to the field of fingerprint sensing and processing.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A typical electronic fingerprint sensor is based upon illuminating the finger surface using visible light, infrared light, or ultrasonic radiation. The reflected energy is captured with some form of camera, for example, and the resulting image is framed, digitized and stored as a static digital image. For example, U.S. Pat. No. 4,210,899 to Swonger et al. discloses an optical scanning fingerprint reader cooperating with a central processing station for a secure access application, such as admitting a person to a location or providing access to a computer terminal. U.S. Pat. No. 4,525,859 to Bowles similarly discloses a video camera for capturing a fingerprint image and uses the minutiae of the fingerprints, that is, the branches and endings of the fingerprint ridges, to determine a match with a database of reference fingerprints.

Unfortunately, optical sensing may be affected by stained fingers or an optical sensor may be deceived by presentation of a photograph or printed image of a fingerprint rather than a true live fingerprint. In addition, optical schemes may require relatively large spacings between the finger contact surface and associated imaging components. Moreover, such sensors typically require precise alignment and complex scanning of optical beams. Accordingly, optical sensors may thus be bulky and be susceptible to shock, vibration and surface contamination. Accordingly, an optical fingerprint sensor may be unreliable in service in addition to being bulky and relatively expensive due to optics and moving parts.

U.S. Pat. No. 4,353,056 to Tsikos discloses another approach to sensing a live fingerprint. In particular, the patent discloses an array of extremely small capacitors located in a plane parallel to the sensing surface of the device. When a finger touches the sensing surface and deforms the surface, a voltage distribution in a series connection of the capacitors may change. The voltages on each of the capacitors is determined by multiplexor techniques. Unfortunately, the resilient materials required for the sensor may suffer from long term reliability problems. In addition, multiplexing techniques for driving and scanning each of the individual capacitors may be relatively slow and cumbersome. Moreover, noise and stray capacitances may adversely affect the plurality of relatively small and closely spaced capacitors.

Significant advances have been made in the area of integrated circuit fingerprint sensor, as disclosed, for example, in U.S. Pat. Nos. 5,828,773 and 5,862,248, both assigned to the assignee of the present invention. The disclosed sensors are based upon generating an electric field which can sense the ridges of a fingerprint despite contamination, skin surface damage, and other factors. The sensor is relatively compact and rugged. The sensing die may be mounted on a leadframe so that the conductive pins extend outwardly from side edges of the package.

As disclosed in U.S. Pat. No. 5,862,248 to Salatino et al., an electrically conductive ring may be formed surrounding an opening in the encapsulating package. The integrated circuit die is exposed through the opening. The conductive ring may be used to drive the finger of the user to produce the fingerprint image from a plurality of sensing electrodes on the surface of the integrated circuit. Electrical contact between the conductive ring and the integrated circuit may be established by positioning the ring on an insulating layer on the die and forming one or more conductor filled vias through the insulating layer.

U.S. Pat. No. 5,940,526 to Setlak et al. discloses additional advances in the area of electric field fingerprint sensors. In particular, two electrically conductive rings are provided on the exterior upper surface of the housing. One ring may be used to discharge accumulated electrical charge from the finger of the user. The other electrode can be used to sense finger contact to thereby wake-up the device and supply power thereto. Connections from the integrated circuit die to the external rings may be made by conductor filled vias extending through the housing.

Unfortunately, the electric field fingerprint sensors as described above may still be susceptible to ESD events. This potential problem is made more difficult since the user's finger directly contacts a relatively thin dielectric layer over the array of sensing elements. Accordingly, to facilitate more widespread use and reliability, there are still additional enhancements needed in the area of coping with ESD.

SUMMARY OF THE INVENTION

In view of the foregoing background, it is therefore an object of the present invention to provide a fingerprint sensor package which is resistant to transients, such as ESD events.

This and other objects, features and advantages in accordance with the present invention are provided by a fingerprint sensor package comprising a fingerprint sensing integrated circuit within a housing and comprising a plurality of electric field sensing electrodes and processing circuitry connected thereto; at least one external electrode carried by the housing for finger contact; an electrostatic discharge (ESD) circuit within the housing and connected to the at least one external electrode; and an isolation circuit within the housing. The isolation circuit is connected to the at least one line of the processing circuitry for external connection. The external electrode and ESD circuit, as well as the line isolation circuit protect the integrated circuit against damage by voltage transients, such as ESD.

The at least one line for external connection may comprise at least one power supply line. Accordingly, the isolation circuit may comprise a power supply isolation circuit connected to the at least one power supply line. The power supply isolation circuit may include a DC power modulator, and a DC power demodulator magnetically coupled thereto.

In an alternate embodiment, a respective resistor may be coupled in series with one or both of the power supply lines instead of the DC power modulator and demodulator.

The at least one line for external connection may alternately or additionally comprise at least one data signal line. Accordingly, the isolation circuit may comprise a data signal isolation circuit connected to the at least one data signal line, such as including one or more opto-isolators. In another embodiment, the data signal isolation circuit may include a respective resistor connected in series with one or more of the data signal lines instead of the opto-isolators.

In accordance with another aspect of the invention, the at least one external electrode may include first and second external electrodes. The first electrode may be connected to the electrostatic discharge circuit. In addition, the processing circuit may further comprise a wake-up circuit for selectively powering predetermined circuit portions responsive to sensing finger contact with the second external electrode. Moreover, the housing may define a recess therein to guide a finger of a user along a predetermined path of travel to contact the first external electrode before the second external electrode. Accordingly, power is not applied until the electrostatic energy has been discharged through the first external electrode.

The fingerprint sensing integrated circuit is preferably mounted on a circuit substrate. The electric field sensing electrodes define a finger sensing area which is directly contacted by a finger of the user. The fingerprint sensor package may also include at least one power supply rail on the circuit substrate laterally outside of the finger sensing area. Accordingly, another potentially damaging discharge path for ESD is accounted for in the invention.

A method aspect is for making a fingerprint sensor package comprising the step of forming a fingerprint sensing integrated circuit including a plurality of electric field sensing electrodes and processing circuitry connected thereto, with the processing circuit comprising at least one line for external connection. The method also includes positioning the fingerprint sensing integrated circuit within a housing, and forming at least one external electrode on the housing for contact by a finger of a user. The method also preferably includes providing an electrostatic discharge circuit within the housing and connected to the at least one external electrode for protecting the fingerprint sensing integrated circuit; and isolating the at least one line for external connection for further protecting the fingerprint sensing integrated circuit.

The at least one line for external connection may comprise at least one power supply line, and the step of isolating comprises connecting a power supply isolation circuit to the at least one power supply line. The at least one line for external connection may alternately or additionally comprise at least one data signal line. Thus, the step of isolating may comprise connecting a data signal isolation circuit to the at least one data signal line.

The step of forming the at least one external electrode preferably comprises forming first and second external electrodes. The first electrode is preferably connected to the electrostatic discharge circuit. The method may also include the step of selectively powering portions of the processing circuitry responsive to sensing finger contact with the second external electrode. In addition, forming the fingerprint sensing integrated circuit may further include forming at least one power rail on a semiconductor substrate laterally adjacent a sensing area defined by the electric field sensing electrodes.

BRIEF DESCRIPTION OF THE DRAWINGS

FIG. 1 is a perspective view of the fingerprint sensor package mounted on a laptop computer in accordance with the present invention.

FIG. 2 is an enlarged top plan view of the fingerprint sensor package as shown in FIG. 1.

DETAILED DESCRIPTION OF THE PREFERRED EMBODIMENTS

Figure 4:
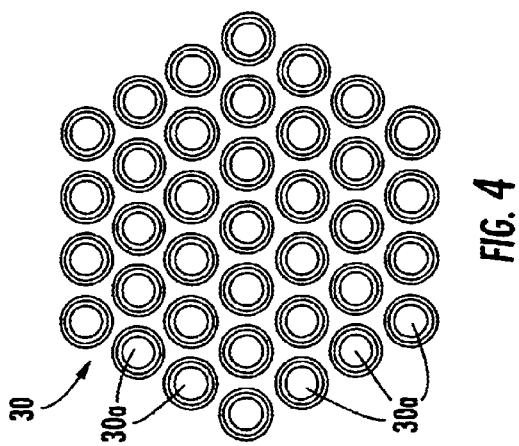
FIG. 4 is a greatly enlarged top plan view of the electric field sensing elements of the sensor in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in different embodiments. The scaling of various features, particularly layers in the drawing figures, have been exaggerated for clarity of explanation.

Referring to FIGS. 1–4, the fingerprint sensor package 30 in accordance with the invention is initially described. As shown in FIG. 1, the sensor package 30 is especially suited for certain applications, such as mounted in a laptop computer 35. The sensor package 30 may be used to confirm the identity of a user of the computer 35 as will be understood by those skilled in the art. The laptop computer 35 includes a keyboard area 36, and folding display screen 37 of course, the amount of area to add an additional component, such as a fingerprint sensor, is extremely limited for a laptop computer 35. Direct connection to a motherboard for the computer is not practical. In addition, any add-on components desirably have a minimal impact on the design of the computer 35. The fingerprint sensor package 30 in accordance with the present invention addresses a number of these important concerns, as well as others.

The illustrated sensor package 30 includes a housing 51, a dielectric layer 52 exposed on an upper surface and which provides a placement surface for the finger 79. A first conductive strip or external electrode 54 is on the upper surface of the housing 51, and a second external electrode 53 provide contact electrodes for the finger 79 as described in greater detail below. The sensor 30 may provide output signals in a range of sophistication levels depending on the level of processing incorporated in the package as would be readily understood by those skilled in the art.

The sensor package 30 includes a sensing integrated circuit 40 which, in turn, includes a plurality of individual pixels or sensing elements 30a arranged in array pattern as perhaps best shown in FIG. 4. As would be readily understood by those skilled in the art, these sensing elements are relatively small so as to be capable of sensing the ridges and intervening valleys of a typical fingerprint. As will also be readily appreciated by those skilled in the art, live fingerprint readings as from the electric field fingerprint sensing integrated circuit 40 in accordance with the present invention may be more reliable than optical sensing, because the impedance of the skin of a finger in a pattern of ridges and valleys is extremely difficult to simulate. In contrast, an optical sensor may be readily deceived by a photograph or other similar image of a fingerprint, for example.

Figure 3:
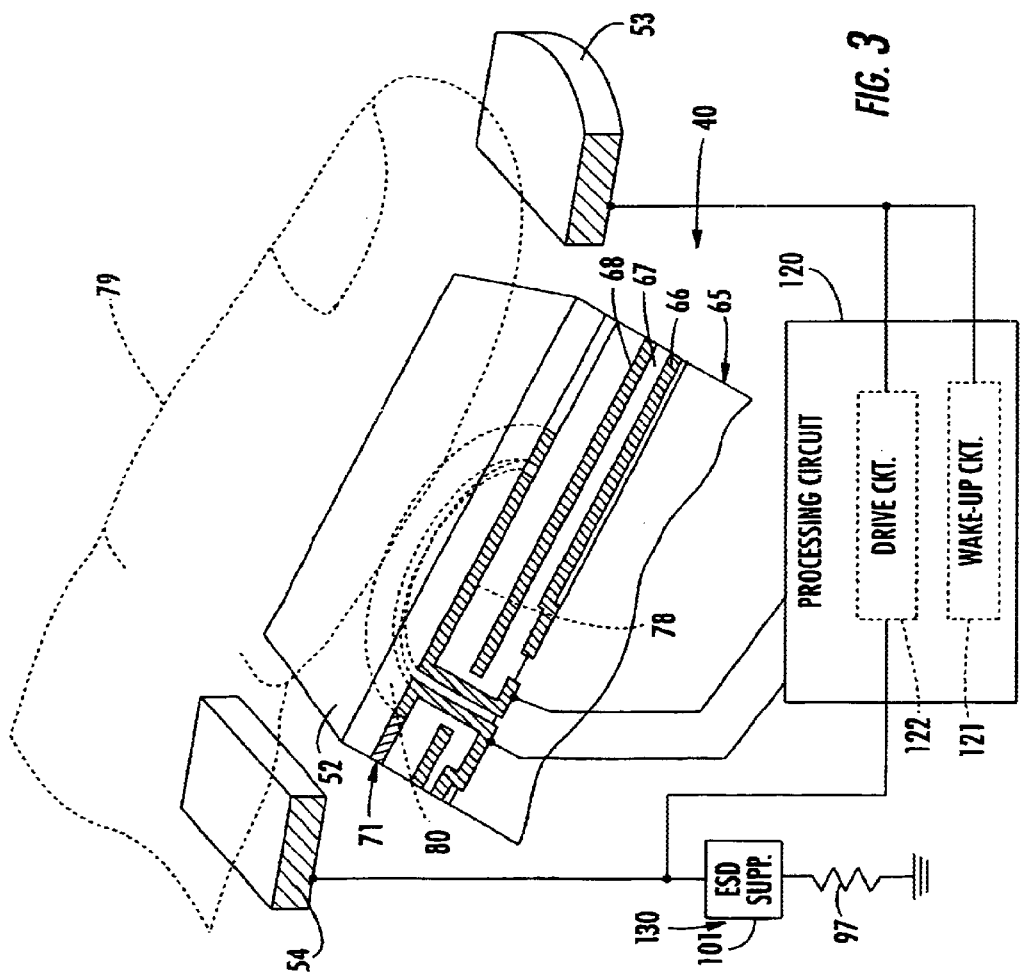
FIG. 3 is a schematic cross-sectional view of a portion of the fingerprint sensor as shown in FIG. 1 illustrating just one greatly enlarged electric field sensing element for clarity.
Figure 5:
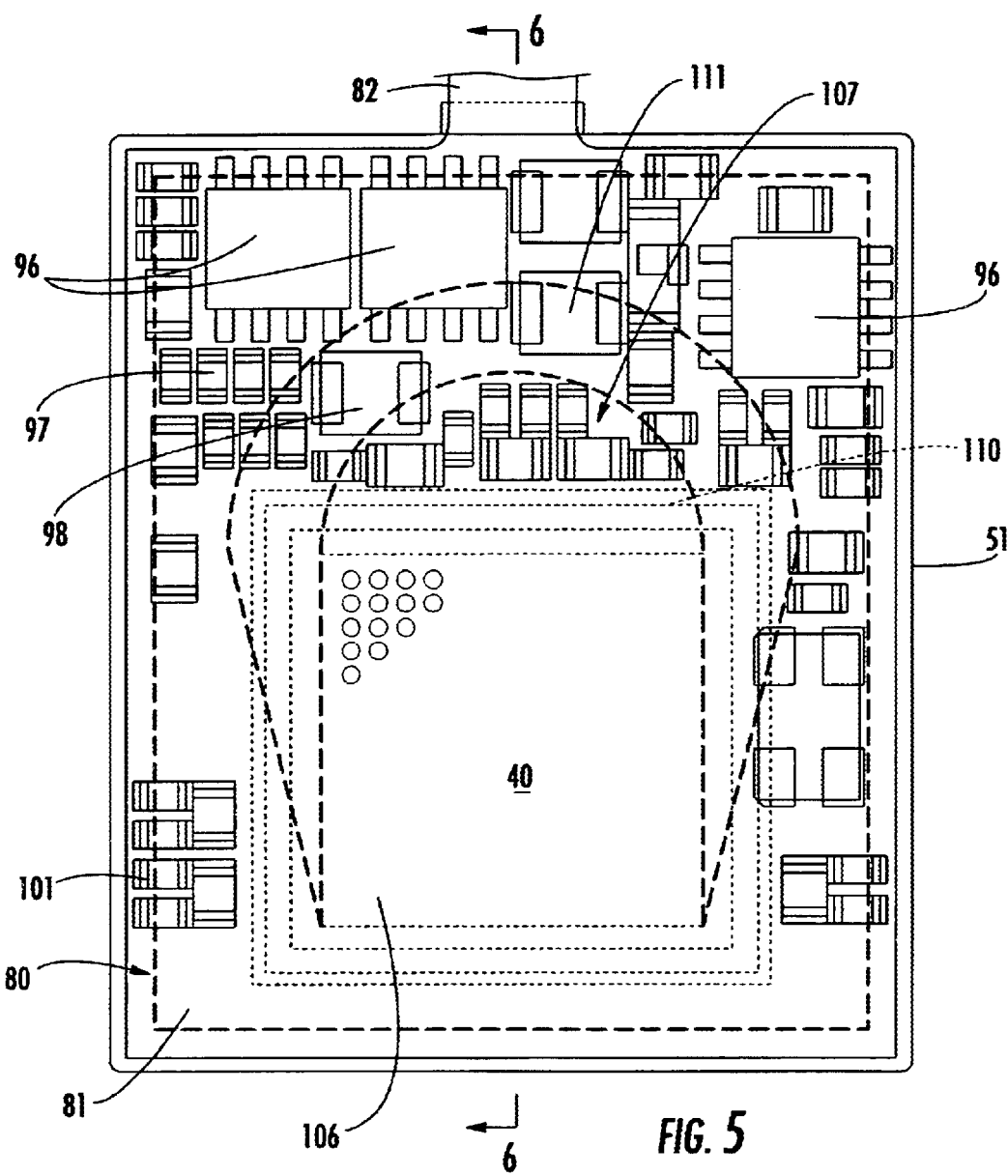
FIG. 5 is an enlarged top plan view of a first portion of the flexible circuit substrate populated with components in accordance with the present invention.
Figure 6:
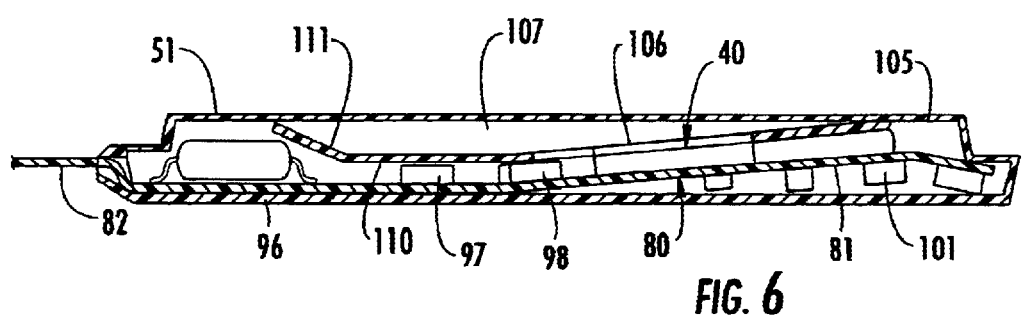
FIG. 6 is a cross-sectional view taken along lines 6—6 of FIG. 5.

The fingerprint sensing integrated circuit 40 as shown in FIG. 3, also includes a substrate 65, and one or more active semiconductor devices formed thereon as will be readily appreciated by those skilled in the art. A second or ground plane electrode layer 68 is above the first metal layer 66 and separated therefrom by an insulating layer 67. A third metal layer 71 is positioned over another dielectric layer 70. The first external electrode 54, and/or the second external electrode 53 may be connected to an excitation drive amplifier, not shown, which, in turn, drives the finger 79 with a signal that may typically be in the range of about 1 KHz to 1 MHz. Accordingly, the drive or excitation electronics are thus relatively uncomplicated and the overall cost of the fingerprint sensor package 30 may be relatively low, while the reliability is great.

An illustratively circularly shaped electric field sensing electrode 78 is on the insulating layer 70. The sensing electrode 78 may be connected to sensing electronics, such as an amplifier, not shown, and formed adjacent the substrate 65 as would be readily appreciated by those skilled in the art.

An annularly shaped shield electrode 80 surrounds the sensing electrode 78 in spaced relation therefrom. As would be readily appreciated by those skilled in the art, the sensing electrode 78 and its surrounding shield electrode 80 may have other shapes, such as hexagonal, for example, to facilitate a close packed arrangement or array of pixels or sensing elements 30a. The shield electrode 80 is an active shield which is driven by a portion of the output of an amplifier to help focus the electric field energy and, moreover, to thereby reduce the need to drive adjacent electric field sensing electrodes 78.

The fingerprint sensing integrated circuit 40 includes only three metal or electrically conductive layers 66, 68 and 71. The integrated circuit 40 can be made without requiring additional metal layers which would otherwise increase the manufacturing cost, and, perhaps, reduce yields. Accordingly, the integrated circuit 40 is less expensive and may be more rugged and reliable than a sensor including four or more metal layers as would be appreciated by those skilled in the art.

In general, the sensing elements 30a operate at very low currents and at very high impedances. For example, the output signal from each sensing electrode 78 is desirably about 5 to 10 millivolts to reduce the effects of noise and permit further processing of the signals. The approximate diameter of each sensing element 30a, as defined by the outer dimensions of the shield electrode 80, may be about 0.002 to 0.005 inches in diameter. The ground plane electrode 68 protects the active electronic devices from unwanted excitation. The various signal feedthrough conductors for the electrodes 78, 80 to the active electronic circuitry may be readily formed as would be understood by those skilled in the art.

The overall contact or sensing surface for the fingerprint sensing integrated circuit 40 may desirably be about 0.5 by 0.5 inches—a size which may be readily manufactured and still provide a sufficiently large surface for accurate fingerprint sensing and identification. The fingerprint sensor integrated circuit 40 in accordance with the invention is also fairly tolerant of dead pixels or sensing elements 30a. A typical sensor integrated circuit 40 includes an array of about 256 by 256 pixels or sensor elements, although other array sizes are also contemplated by the present invention. The integrated circuit 40 may also be fabricated at one time using primarily conventional semiconductor manufacturing techniques to thereby significantly reduce the manufacturing costs.

Operation of the fingerprint sensor and, in particular, the image processing circuitry thereof, is further described in U.S. Pat. Nos. 5,828,773; 5,862,248; and 5,940,526 assigned to the assignee of the present invention. The subject matter of each of these patents is incorporated herein by reference in its entirety.

Referring now additional to FIGS. 4–9, the fingerprint sensor package 30 is further described. The fingerprint sensor package 30 comprises a fingerprint sensing integrated circuit 40 as described above, mounted in the housing 51. More particularly, the sensor package 30 includes a circuit substrate comprising first and second portions 81, 82 connected together. The first portion 81 is within the housing 51 and mounts the fingerprint sensing integrated circuit 40. The second portion 82 is flexible and extends outwardly from the housing 51 for facilitating electrical connection to the fingerprint sensing integrated circuit 40 and associated circuitry from external to the housing. Each portion of the circuit substrate preferably includes at least one insulating layer and at least one electrical conductor thereon. Accordingly, the package 30 can be made relatively compact and electrical interconnections are facilitated by the second portion 82 or extension of the circuit substrate 80.

In the illustrated embodiment, the first and second portions 81, 82 are integrally formed together. In this embodiment, the first portion 81 is also flexible which facilitates its positioning at an angle as perhaps best shown in the cross-sectional view of FIG. 6. In other embodiments, only the second portion 82 needs to be flexible, although considerable manufacturing advantages are presented by the embodiment with both portions 81, 82 being flexible and integrally formed as will be readily appreciated by those skilled in the art.

The second portion 82 preferably has an elongate strip shape, such as to be routed through an interior of the laptop computer 35 to a corresponding connector which receives the end of the second portion 82. As shown perhaps best in FIGS. 7 to 9, the second portion 82 includes a plurality of electrical conductors in the form of conductive layers 86, 87 arranged in side-by-side relation on a flexible plastic layer 90. The second portion 82 may further comprise an insulating covering 91 on the conductors. The insulating covering may have at least one opening 92 therein adjacent a distal end of the second portion 82 to facilitate receipt and connection to a corresponding electrical connector. The distal end of the second portion 82 may also include a plastic reinforcement layer 93 to facilitate insertion into a mating connector as will be readily appreciated by those skilled in the art.

Another aspect of the invention is that the fingerprint sensor package 30 may also include at least one component carried by the first portion of the flexible circuit substrate. The components may include other integrated circuits 96, resistors 97, and capacitors 98, for example. The components may also include one or more electrostatic discharge suppressors 101 as would be readily appreciated by those skilled in the art. An ESD suppressor 101 may typically be physically too large to be incorporated into the integrated circuit 40, and, hence, the circuit substrate 80 provides a convenient and nearby location for placement of the suppressor.

In addition, the components can be mounted on both the top and bottom surfaces of the first portion 81 of the circuit substrate 80. The circuit substrate 80 may also include multiple conductive and insulating layers as will also be readily appreciated by those skilled in the art.

A method aspect of the invention for making a fingerprint sensor package 30 of a type comprising a housing 51, and a fingerprint sensing integrated circuit 40 in the housing. The method preferably comprises forming a circuit substrate 80 comprising first and second portions 81, 82 connected together, with each portion comprising at least one insulating layer 90 and at least one electrical conductor 86 thereon, and at least the second portion being flexible.

The method also preferably includes mounting the fingerprint sensing integrated circuit 40 on the first portion, and positioning the circuit substrate 80 so that the first portion 81 is within the housing 51 and the second portion 82 extends outwardly from the housing to facilitate electrical connection to the fingerprint sensing integrated circuit 40 from external to the housing. The step of forming the circuit substrate may preferably comprise forming the circuit substrate 80 to have integrally formed first and second portions 81, 82. In this embodiment, forming the circuit substrate comprises forming the circuit substrate to also have a flexible first portion.

Another significant aspect of the invention relates to the configuration of the housing 51. More particularly, the housing 51 includes portions defining generally planar upper surface 105, a downwardly sloping opening 106 in a medial portion of the generally planar upper surface, and a fingertip receiving recess 107 adjacent a lower end of the downwardly sloping opening. The fingerprint sensing integrated circuit 40 is positioned in the housing 51 and aligned for exposure through the downwardly sloping opening 106. The downward slope and fingertip receiving recess 107 cooperate to encourage proper positioning of a finger 79 adjacent the fingerprint sensing integrated circuit 40. As perhaps best shown in FIG. 3, the last knuckle of the user's finger is positioned at about the start of the downward slope. Accordingly, the user's comfort in using the fingerprint sensor package 30 is greatly enhanced over conventional flat packages.

The housing portions defining the fingertip receiving recess preferably comprise a generally planar fingertip land surface 110 at a lower end of the downwardly sloping opening 106, and parallel with the generally planar upper surface 105 of the housing 51. In addition, the housing portions defining the fingertip receiving recess 107 may also include a generally arcuate and sloped wall portion 111 extending downwardly from the generally planar upper surface 105 of the housing 51.

The fingerprint sensor package also includes the first electrode 54 on the generally planar upper surface 105 of the housing 51 adjacent an upper end of the downwardly sloping opening 106. In accordance with another feature of the invention, the at least one electrostatic discharge component, such as the ESD suppressor 101 is preferably connected to the first electrode 54.

The fingerprint sensor package 30 also illustratively includes the second electrode 53 carried by the fingertip receiving recess 107. Moreover, the fingerprint sensing integrated circuit 40 may preferably include a processing circuit 120, which, in turn, may include a wake-up circuit 121 (FIG. 3) for waking up the processing circuit responsive to finger contact with the second electrode. In other words, the wake-up circuit 121 may be contacted as the user slides his finger 79 downward and after having already discharged any accumulated static charge via the first electrode 54.

As shown in the illustrated embodiment, the fingerprint sensing integrated circuit 40 may further comprise a drive circuit 122 (FIG. 3) connected to the at least one of the first and second electrodes. The drive circuit 122 is for supplying a drive signal to a finger of a user as described above.

Another method aspect of the invention includes forming a housing 51 comprising portions defining a generally planar upper surface 105, a downwardly sloping opening 106 in a medial portion of the generally planar upper surface, and a fingertip receiving recess 107 adjacent a lower end of the downwardly sloping opening; and positioning a fingerprint sensing integrated circuit 40 in the housing and aligned for exposure through the downwardly sloping opening. Accordingly, the downward slope and fingertip receiving recess 107 cooperate to encourage proper positioning of a finger 79 adjacent the fingerprint sensing integrated circuit 40.

The step of forming the housing may comprise forming the housing 51 with a generally planar fingertip land surface 110 at a lower end of the downwardly sloping opening 106, and parallel with the generally planar upper surface 105 of the housing. The step of forming the housing may also include forming a generally arcuate and sloped wall portion 111 extending downwardly from the generally planar upper surface of the housing.

The method may further comprise forming at least one electrode 53, 54 on the housing 51. In addition, the method may also include the step of mounting the fingerprint sensing integrated circuit 40 on a flexible circuit substrate 80 comprising a first portion 81 positioned within the housing. The flexible circuit substrate preferably comprises a second portion 82 integrally formed with the first portion. Accordingly, the step of positioning the circuit substrate 80 preferably comprises positioning the second portion 82 extending outwardly from the housing for facilitating electrical connection to the fingerprint sensing integrated circuit 40 and other components from external to the housing 51.

Another important aspect of the invention, which has been briefly mentioned above, is related to controlling potentially large electrostatic discharges from damaging the fingerprint sensing integrated circuit 40. The integrated circuit 40 may be particularly vulnerable to ESD, since the finger of the user directly contacts the upper surface of the circuit. Moreover, the sensor integrated circuit 40 includes a plurality of electric field sensing electrodes 78 and shield electrodes 80 protected by only a relatively thin dielectric layer 52. Accordingly, the fingerprint sensor package 30 incorporates a number of important ESD protection measures which are now described in greater detail.

The fingerprint sensor package 30 includes an electrostatic discharge (ESD) circuit 130 within the housing 51 and connected to the at least one external electrode 53, 54. The package 30 also preferably includes an isolation circuit 125 (FIG. 7) within the housing 50 and connected to at least one line of the processing circuitry for external connection. In the illustrated embodiment of FIG. 7, the isolation circuit 125 includes respective opto-isolators 126 interposed on three signal lines including a serial data input line, a serial data output line, and a clock signal line. Those of skill in the art will recognize that other signals may desirably be exchanged with off-board circuitry, and these lines as well would desirably be protected to avoid possible transients, such as ESD events. The external electrode and ESD circuit 130, as well as the line isolation circuit 125, protect the integrated circuit 40 and its associated circuitry against damage by voltage transients, such as ESD.

Figure 7:
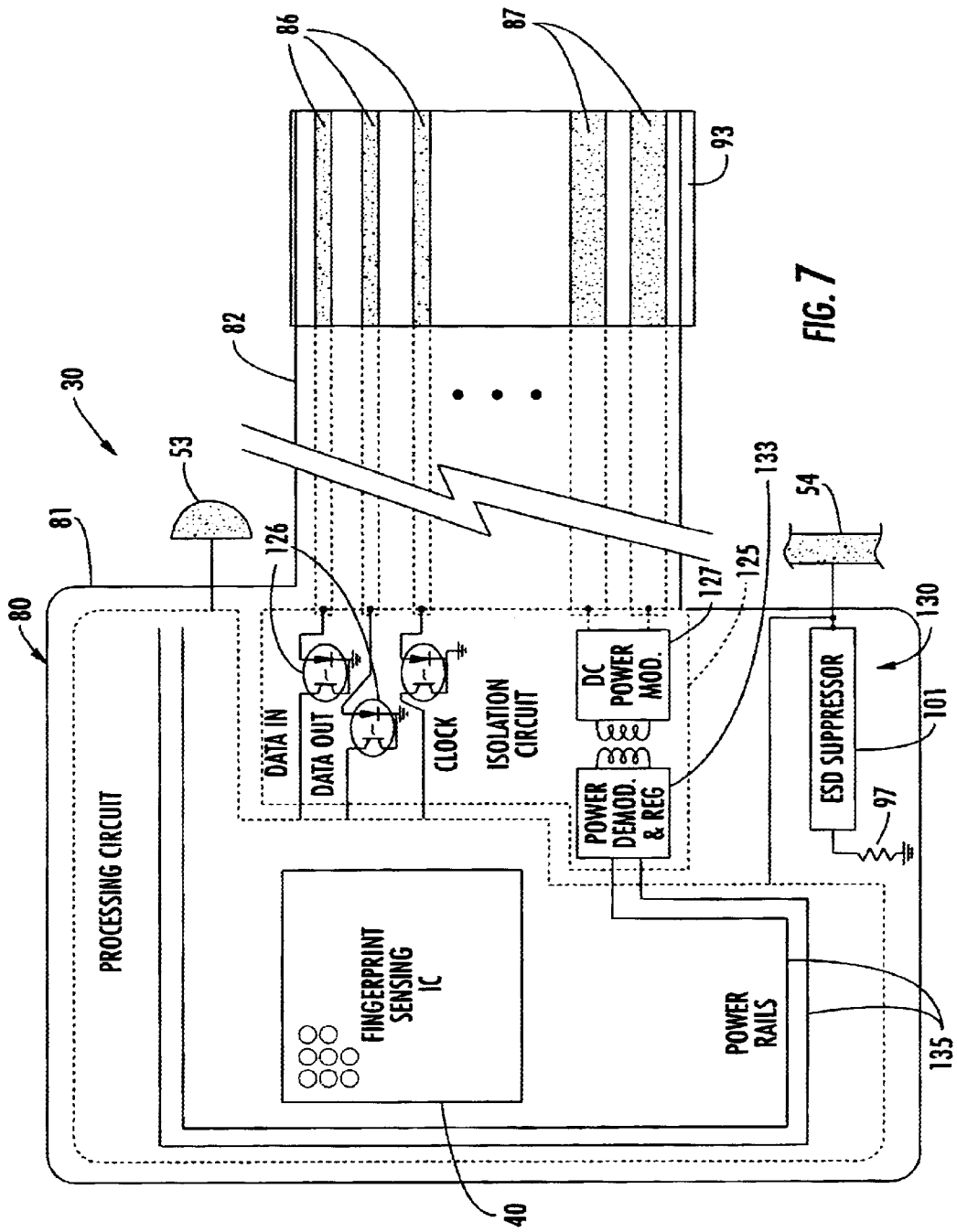
FIG. 7 is an enlarged, partially schematic, top plan view of the flexible circuit substrate and fingerprint sensing integrated circuit in accordance with the present invention and with the housing removed for clarity.
Figure 8:
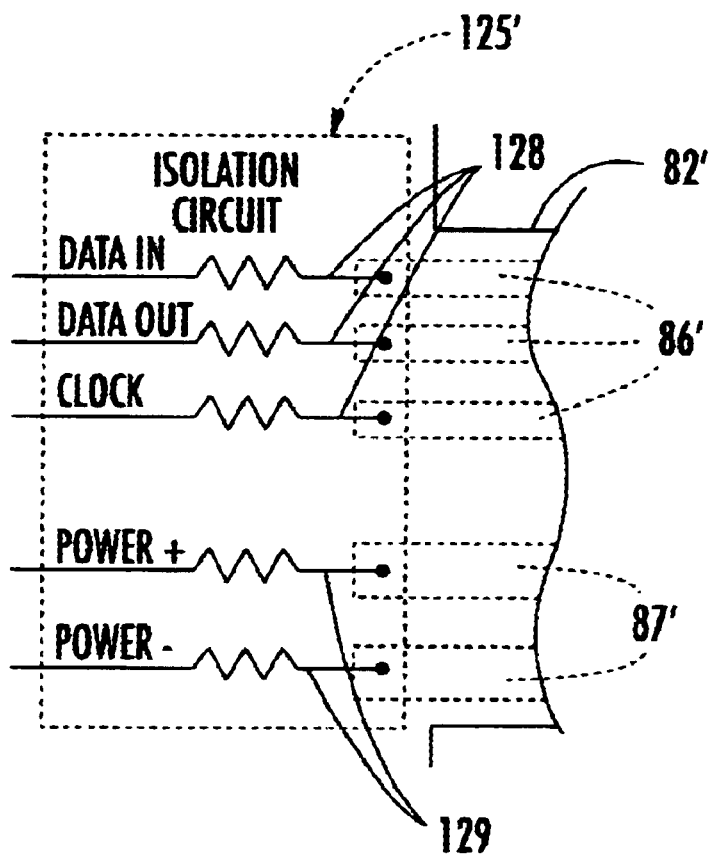
FIG. 8 is a schematic diagram of another embodiment of the isolation circuit as shown in FIG. 7.
Figure 9:
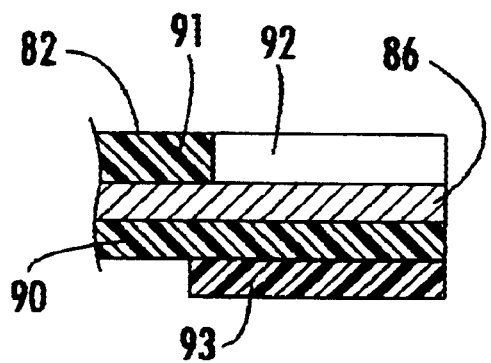
FIG. 9 is an enlarged cross-sectional view of an end portion of the second flexible circuit portion of the sensor package in accordance with the invention.

Another embodiment of the isolation circuit 125' is shown in FIG. 8, wherein first resistors 128 are series connected and therefore used in place of opto-isolators 126 (FIG. 7) for the data and clock signal lines 86' on the flexible substrate second portion 82'. Of course, other line isolation circuits for the signal lines 86' are also contemplated by the present invention as will be readily understood by those skilled in the art. The resistors 128 may offer the added benefit of simplicity of construction as compared to the opto-isolators 126, for example.

Of course, the at least one line for external connection may comprise at least one power supply line, and, as shown in the illustrated embodiment of FIG. 7, a pair of power supply lines 87. Accordingly, the isolation circuit 125 may comprise a power supply isolation circuit connected to the at least one power supply line. The power supply isolation circuit may include a DC power modulator 127 and a DC power demodulator and regulator 133 magnetically coupled thereto as shown in the illustrated embodiment of FIG. 7 and as will be readily appreciated by those skilled in the art.

Referring again briefly to FIG. 8, in an alternate embodiment of the isolation circuit 125', second resistors 129 may also be series connected with the respective power supply lines 87' in place of the DC power modulator and demodulator 127 and 133, respectively. As will be readily understood by those skilled in the art, other line isolation circuits for the power lines 87' are also contemplated by the present invention. The resistors 129 may offer the added benefit of simplicity of construction as compared to the DC power modulator and demodulator, for example.

In accordance with another aspect of the invention relating to ESD protection, the at least one external electrode may include the illustrated first and second external electrodes 54, 53. The first electrode 54 is connected to the electrostatic discharge circuit 130. In addition, the processing circuitry 120 (FIG. 3) may further comprise the wake-up circuit 121, as discussed above, for selectively powering predetermined circuit portions responsive to sensing finger contact with the second external electrode 53. Moreover, as also described above, the housing 51 may define a recess therein to guide a finger of a user along a predetermined path of travel to contact the first external electrode 54 before the second external electrode 53. Accordingly, power is not applied until the electrostatic energy has been discharged through the first external electrode 54 as will be readily appreciated by those skilled in the art.

The fingerprint sensing package 30 may also include at least one power supply rail on the circuit substrate 80 laterally outside of the area of the fingerprint sensing integrated circuit 40, as perhaps best shown in FIG. 7. If the power supply rails extended under the finger sensing area, large transients could be potentially generated. Accordingly, this potentially damaging discharge path for ESD is accounted for in accordance with this feature of the invention.

A method aspect relating to ESD protection is for making a fingerprint sensor package 30 comprising forming a fingerprint sensing integrated circuit 40 including a plurality of electric field sensing electrodes 78 and processing circuitry 120 connected thereto, with the processing circuitry 120 comprising at least one line for external connection. The method also includes positioning the fingerprint sensing integrated circuit 40 within the housing 51, and forming at least one external electrode 53, 54 on the housing for contact by a finger of a user. The method also preferably includes providing an electrostatic discharge circuit 130 within the housing 51 and connected to the at least one external electrode 54 for protecting the fingerprint sensing integrated circuit 40, and isolating the at least one line for external connection for further protecting the fingerprint sensing integrated circuit.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fingerprint sensor package comprising:
a housing;
a fingerprint sensing integrated circuit within said housing and comprising a plurality of electric field sensing electrodes and processing circuitry connected thereto, said processing circuitry comprising at least one power supply line for external connection;
at least one external electrode carried by said housing for contact by a finger of a user;
an electrostatic discharge circuit within said housing and connected to said at least one external electrode for protecting said fingerprint sensing integrated circuit; and
a power supply isolation circuit within said housing and connected to the at least one power supply line for external connection for further protecting said fingerprint sensing integrated circuit;
said power supply isolation circuit comprising a DC power modulator and a DC power demodulator magnetically coupled thereto.

2. A fingerprint sensor package according to claim 1 wherein said power supply isolation circuit comprises at least one series connected resistor.

3. A fingerprint sensor package according to claim 1 wherein the at least one external electrode comprises first and second external electrodes; wherein the first electrode is connected to said electrostatic discharge circuit; and wherein said processing circuitry further comprises a wake-up circuit for selectively powering predetermined circuit portions responsive to sensing finger contact with the second external electrode.

4. A fingerprint sensor package according to claim 3 wherein said housing defines a recess therein to guide a finger of a user along a predetermined path of travel to contact the first external electrode before the second external electrode.

5. A fingerprint sensor package according to claim 1 further comprising a circuit substrate mounting said fingerprint sensing integrated circuit.

6. A fingerprint sensor package according to claim 5 wherein said electric field sensing electrodes define a finger sensing area; and wherein said circuit substrate further comprises at least one power supply rail only laterally outside of the finger sensing area.

7. A fingerprint sensor package comprising:
a housing;
a fingerprint sensing integrated circuit within said housing and comprising a plurality of electric field sensing electrodes and processing circuitry connected thereto, said processing circuitry comprising at least one data signal line for external connection;
at least one external electrode carried by said housing for contact by a finger of a user;
an electrostatic discharge circuit within said housing and connected to said at least one external electrode for protecting said fingerprint sensing integrated circuit; and
a data signal isolation circuit within said housing and connected to the at least one data signal line for external connection, said data signal isolation circuit comprising at least one series connected resistor.

8. A fingerprint sensor package according to claim 7 wherein said processing circuitry further comprises at least one power supply line; and further comprising a power supply isolation circuit connected to the at least one power supply line.

9. A fingerprint sensor package according to claim 7 wherein the at least one external electrode comprises first and second external electrodes; wherein the first electrode is connected to said electrostatic discharge circuit; and wherein said processing circuitry further comprises a wake-up circuit for selectively powering predetermined circuit portions responsive to sensing finger contact with the second external electrode.

10. A fingerprint sensor package according to claim 9 wherein said housing defines a recess therein to guide a finger of a user along a predetermined path of travel to contact the first external electrode before the second external electrode.

11. A fingerprint sensor package according to claim 9 further comprising a circuit substrate mounting said fingerprint sensing integrated circuit; wherein said electric field sensing electrodes define a finger sensing area; and wherein said circuit substrate further comprises at least one power supply rail only laterally outside of the finger sensing area.

12. A fingerprint sensor package comprising:
a housing;
a fingerprint sensing integrated circuit within said housing and comprising a plurality of electric field sensing electrodes and processing circuitry connected thereto;
a circuit substrate mounting said fingerprint sensing integrated circuit and comprising at least one power supply rail extending only laterally adjacent said fingerprint sensing integrated circuits;
at least one external electrode carried by said housing for contact by a finger of a user; and
an electrostatic discharge circuit within said housing and connected to said at least one external electrode for protecting said fingerprint sensing integrated circuit.

13. A fingerprint sensor package according to claim 12 wherein said processing circuitry further comprises at least one line for external connection; and further comprising an isolation circuit within said housing and connected to the at least one line for external connection for further protecting said fingerprint sensing integrated circuit.

14. A fingerprint sensor package according to claim 13 wherein said at least one line for external connection comprises at least one power supply line; and wherein said isolation circuit comprises a power supply isolation circuit connected to the at least one power supply line.

15. A fingerprint sensor package according to claim 14 wherein said power supply isolation circuit comprises a DC power modulator and a DC power demodulator magnetically coupled thereto.

16. A fingerprint sensor package according to claim 14 wherein said power supply isolation circuit comprises at least one series connected resistor.

17. A fingerprint sensor package according to claim 13 wherein said at least one line for external connection comprises at least one data signal line; and wherein said isolation circuit comprises a data signal isolation circuit connected to the at least one data signal line.

18. A fingerprint sensor package according to claim 17 wherein said data signal isolation circuit comprises at least one opto-isolator.

19. A fingerprint sensor package according to claim 17 wherein said data signal isolation circuit comprises at least one series connected resistor.

20. A fingerprint sensor package according to claim 12 wherein the at least one external electrode comprises first and second external electrodes; wherein the first electrode is connected to said electrostatic discharge circuit; and wherein said processing circuitry further comprises a wake-up circuit for selectively powering predetermined circuit portions responsive to sensing finger contact with the second external electrode.

21. A fingerprint sensor package according to claim 20 wherein said housing defines a recess therein to guide a finger of a user along a predetermined path of travel to contact the first external electrode before the second external electrode.

22. A method for making a fingerprint sensor package comprising:
forming a fingerprint sensing integrated circuit including a plurality of electric field sensing electrodes and processing circuitry connected thereto, the processing circuitry comprising at least one data signal line for external connection;
positioning the fingerprint sensing integrated circuit within a housing;
forming at least one external electrode on the housing for contact by a finger of a user;
providing an electrostatic discharge circuit within said housing and connected to said at least one external electrode for protecting the fingerprint sensing integrated circuit; and
isolating the at least one data signal line for external connection by connecting a data signal isolation circuit to the at least one data signal line for further protecting said fingerprint sensing integrated circuit, the data isolation circuit comprising at least one series connected resistor.

23. A method according to claim 22 wherein forming the at least one external electrode comprises forming first and second external electrodes; wherein the first electrode is connected to the electrostatic discharge circuit; and further comprising selectively powering portions of the processing circuitry responsive to sensing finger contact with the second external electrode.

24. A method according to claim 22 further comprising forming a circuit substrate mounting the fingerprint sensing integrated circuit and comprising at least one power rail only laterally adjacent the fingerprint sensing integrated circuit.

* * * * *